(12) United States Patent
Bucknell et al.

(10) Patent No.: US 9,001,731 B2
(45) Date of Patent: Apr. 7, 2015

(54) METHOD FOR COMMUNICATING IN A NETWORK, A SECONDARY STATION AND SYSTEM THEREFOR

(75) Inventors: Paul Bucknell, Brighton (GB); Bernard Hunt, Redhill (GB); Matthew Peter John Baker, Canterbury (GB); Timothy James Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 542 days.

(21) Appl. No.: 13/058,056

(22) PCT Filed: Aug. 7, 2009

(86) PCT No.: PCT/IB2009/053469
§ 371 (c)(1),
(2), (4) Date: Feb. 8, 2011

(87) PCT Pub. No.: WO2010/018506
PCT Pub. Date: Feb. 18, 2010

(65) Prior Publication Data
US 2011/0128859 A1    Jun. 2, 2011

(30) Foreign Application Priority Data
Aug. 11, 2008   (EP) ..................................... 08300254

(51) Int. Cl.
| | | |
|---|---|---|
| *H04W 4/00* | (2009.01) |
| *H04L 1/18* | (2006.01) |
| *H04L 12/801* | (2013.01) |
| *H04L 1/16* | (2006.01) |
| *H04W 72/12* | (2009.01) |
| *H04L 1/00* | (2006.01) |

(52) U.S. Cl.
CPC ............... *H04L 47/10* (2013.01); *H04L 1/1607* (2013.01); *H04L 1/1874* (2013.01); *H04W 72/1252* (2013.01); *H04L 47/34* (2013.01); *H04L 1/0026* (2013.01)

(58) Field of Classification Search
None
See application file for complete search history.

(56) References Cited

U.S. PATENT DOCUMENTS

| | | | |
|---|---|---|---|
| 5,444,718 A | | 8/1995 | Ejzak et al. |
| 2002/0037000 A1* | | 3/2002 | Park et al. ..................... 370/349 |
| 2002/0172208 A1* | | 11/2002 | Malkamaki ................... 370/400 |
| 2003/0022628 A1* | | 1/2003 | Mamiya et al. .............. 455/67.1 |

(Continued)

FOREIGN PATENT DOCUMENTS

| | | |
|---|---|---|
| CN | 1111889 A | 11/1995 |
| EP | 1764942 A2 | 3/2007 |

(Continued)

OTHER PUBLICATIONS

Ericsson, "Robustness of Buffer Status Reporting", TSG-RAN WG2 Meeting #62BIS, R2-083149, Warsaw, Poland, Jun. 30-Jul. 4, 2008, 1 Pages.

(Continued)

*Primary Examiner* — Bob Phunkulh

(57) ABSTRACT

The present invention relates to a method of communicating in a network, comprising a secondary station transmitting to a primary station a data packet comprising a report, the secondary station monitoring before transmission of the packet whether said packet includes an indication of the order of transmission in a sequence of transmitted packets, and adding an indication of the order of transmission in a sequence of transmitted packets.

22 Claims, 2 Drawing Sheets

(56) References Cited

U.S. PATENT DOCUMENTS

| | | | |
|---|---|---|---|
| 2003/0045288 A1* | 3/2003 | Luschi et al. | 455/434 |
| 2004/0004954 A1* | 1/2004 | Terry et al. | 370/349 |
| 2005/0138528 A1* | 6/2005 | Ameigeiras et al. | 714/774 |
| 2005/0281232 A1* | 12/2005 | Kim et al. | 370/335 |
| 2006/0251079 A1* | 11/2006 | Kwak et al. | 370/394 |
| 2007/0091810 A1* | 4/2007 | Kim et al. | 370/236 |
| 2007/0133458 A1* | 6/2007 | Chandra et al. | 370/329 |
| 2007/0133579 A1* | 6/2007 | Kim | 370/403 |
| 2008/0076427 A1* | 3/2008 | Huang et al. | 455/436 |
| 2008/0130557 A1 | 6/2008 | Kuchibhotla et al. | |
| 2008/0130681 A1 | 6/2008 | Hong et al. | |
| 2008/0146242 A1* | 6/2008 | Alanara et al. | 455/452.1 |
| 2010/0110878 A1* | 5/2010 | Frederiksen et al. | 370/216 |
| 2010/0150085 A1* | 6/2010 | Ishii et al. | 370/329 |

FOREIGN PATENT DOCUMENTS

| | | |
|---|---|---|
| JP | 2010511320 A | 4/2010 |
| JP | 2010511356 A | 4/2010 |
| WO | 02091710 A2 | 11/2002 |
| WO | 2008067358 A2 | 6/2008 |

OTHER PUBLICATIONS

Philips, NXP Semiconductors, "Improving the Robustness of Buffer Status Reporting", 3GPP TSG RAN WG2 Meeting #63, R2-084090, Jeju, Korea, Aug. 17-22, 2008, 4 Pages.

* cited by examiner

US 9,001,731 B2

METHOD FOR COMMUNICATING IN A NETWORK, A SECONDARY STATION AND SYSTEM THEREFOR

FIELD OF THE INVENTION

The present invention relates to a method for communicating in a network comprising a primary station and at least one secondary station, and to such a secondary station. More specifically, this invention relates to a method for communicating in a mobile telecommunication network, like a GSM (Global System for Mobile communications) or a UMTS (Universal Mobile Telecommunications System) network.

This invention is, for example, relevant for UMTS and UMTS Long Term Evolution, but as well to hubs which route calls from multiple terminals to base stations.

BACKGROUND OF THE INVENTION

In a mobile telecommunication network like a UMTS system, a primary station, for instance a Node B (or Base Station or eNB) communicates with at least one secondary station, for instance a User Equipment (or Mobile Station), by means of a plurality of channels. In order to transmit data to the primary station, a secondary station needs to request a resource to the primary station, which is then allocated. This request of allocation can be made in several ways depending on the considered channel.

In an example, in order to request a resource, it is required to indicate the amount of data to be transmitted, i.e. the data in the buffer of the secondary station. To this end, the secondary station transmits to the primary station a buffer status report indicative of the amount of data in the secondary station buffer. Thus, the primary station allocates a resource corresponding to both the capability of the network and the amount of data to be transmitted. This permits the allocation of resource to be adjusted.

In order to transmit this Report, the secondary station uses for instance an ARQ protocol, or an HARQ protocol. It means that the secondary station may retransmit the message until it receives a positive acknowledgement of reception from the primary station. In such a case, it is possible that a first report is finally correctly received long after having been transmitted, and in some cases even after a second report updating the first report. In such a case, the primary station may discard the second report believing that the first report is representative of the current status. This can lead to a waste of resources (if the second report indicated that no data was in the buffer), or in delays (if the first report indicated that no data was in the buffer).

SUMMARY OF THE INVENTION

It is an object of the invention to propose a method enabling this problem to be alleviated.

It is still another object of the invention to propose a method enabling the reports in the transmission sequence to be reordered.

It is still another object of the invention to propose a method permitting the risk of confusion at the primary station to be reduced.

To this end, a method of communicating in a network is proposed, comprising a secondary station transmitting to a primary station a data packet comprising a report, the secondary station monitoring before transmission of the packet whether said packet includes an indication of the order of transmission in a sequence of transmitted packets, and adding an indication of the order of transmission in a sequence of transmitted packets.

In accordance with a second aspect of the invention, a secondary station is proposed comprising a transmitter for transmitting to a primary station a data packet comprising a buffer status report representative of the amount of data in a buffer of the secondary station, the secondary station further comprising a controller for monitoring before transmission of the packet whether said packet includes an indication of the order of transmission in a sequence of transmitted packets, and said controller being arranged for adding an indication of the order of transmission in a sequence of transmitted packets.

In accordance with a third aspect of the invention, a system of communication is proposed comprising a primary station communicating with a secondary station, said secondary station comprising a transmitter for transmitting to the primary station a data packet comprising a buffer status report representative of the amount of data in a buffer of the secondary station, the secondary station further comprising a controller for monitoring before transmission of the packet whether said packet includes an indication of the order of transmission in a sequence of transmitted packets, and said controller being arranged for adding an indication of the order of transmission in a sequence of transmitted packets.

As a consequence, the primary station is able to reorder the reports to reduce the risk of confusion of the primary station. It means that the primary station is able to know whether a report is representative of a current state of the secondary station and should take it into account or a report is representative of past state of the secondary station which may for example have been superseded by a later indication and should be discarded.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
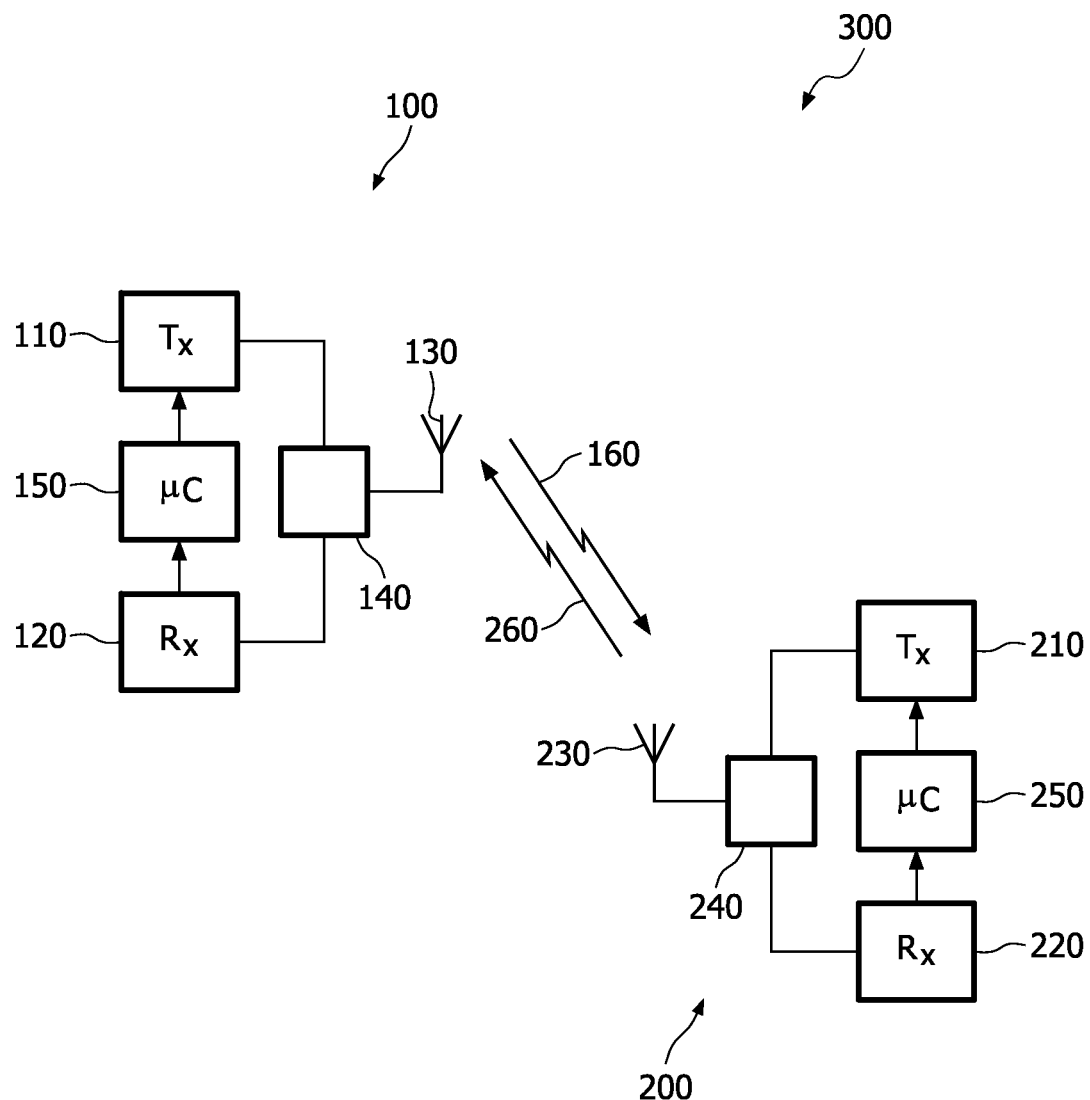
FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

From time to time, the secondary station 200 transmits on the uplink channel 260 an indication of the status of its buffer containing data to be transmitted. This Buffer Status Report can be of different types. A short Buffer Status Report (BSR) comprises the identity of a single group of logical channels, together with a 6-bit indicator of the amount of data corresponding to that group of logical channels currently residing in the secondary station's buffer awaiting transmission. A long BSR comprises 4 concatenated short BSRs, each corresponding to a different group of logical channels.

Many communication systems operate using a centralised scheduler which is responsible for allocating transmission resources to different nodes. A typical example is the uplink of the UMTS LTE, where the uplink transmissions from different UEs are scheduled in time and frequency by the eNB; the eNB transmits a "scheduling grant" message to a UE, indicating a particular time-frequency resource for the UE's transmission typically around 3 ms after the transmission of the grant message. The grant message also typically specifies the data rate and/or power to be used for the UE's transmission.

In order for the eNB to issue appropriate grants, it needs to have sufficient information about the amount, type of data and the urgency of it awaiting transmission in the buffer of each UE. This information can be used to inform the scheduler in the eNB of either the satisfaction level of individual UEs or UEs whose service might be close to being dropped.

In LTE, a number of different types of buffer status report (BSR) messages are therefore defined, which may be transmitted from a UE to the eNB when certain triggers occur. The state of the art in this respect is defined by the current version of 3 GPP TS36.321 (as of June 2008), §5.4.5 incorporated for reference.

A short BSR comprises the identity of a single group of logical channels, together with a 6-bit indicator of the amount of data corresponding to that group of logical channels currently residing in the UE's buffer awaiting transmission. A long BSR comprises 4 concatenated short BSRs, each corresponding to a different group of logical channels.

This is currently defined in 36.321 (as of June 2008) §6.1.3.1 incorporated by reference.

As detailed in this paragraph, there are two main types of Buffer Status Reports (BSR) with different characteristics:
  Regular BSR which is triggered only if UL data arrives in the UE transmission buffer and the data belongs to a logical channel with higher priority than those for which data already existed in the UE transmission buffer.
  Periodic BSR, which is triggered when the PERIODIC BSR TIMER expires.

If the UE has no UL resources allocated for new transmission for this TTI and if a Regular BSR has been triggered since the last transmission of a BSR a Scheduling Request (SR) shall be triggered.

The BSR mechanism has been designed so that only regular BSRs can trigger the sending of an SR if there is no UL resources available for the sending of the a regular BSR. When a periodic BSR is triggered and there is no UL resource allocated then the UE cannot send SR, as it is assumed that the network knows that the UE has data available and is deliberately not allocating any UL resources for the UE to use.

If the periodic BSR were allowed to send SR in the case of no UL resource available for the sending of the BSR then the system may become overloaded with UEs sending SR. Particularly if the UE has no PUCCH resources available, when an SR would require the sending of a RACH access.

Also, it is stated in 36.321 that an SR is considered pending and is repeated until UL-SCH resources are granted.

A problem with the BSR procedure defined above is that there is a possibility that the information that the network knows about the state of the buffers in the UE can be different from the actual state of the UE buffers. This can occur when BSRs are received in the eNB out of order.

Figure 2:
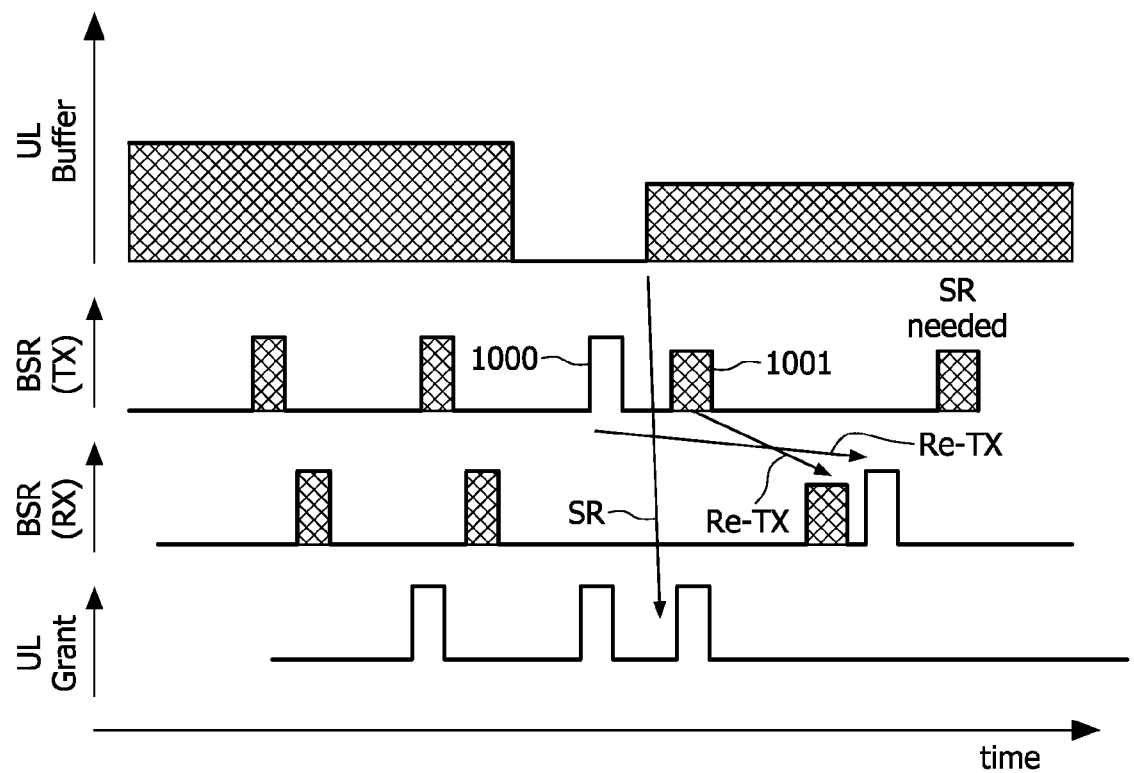
FIG. 2 is a time chart illustrating the exchange of messages in accordance with a conventional technique.

If a network receives BSRs from a UE at different times there is no way for the eNB to determine which was the last BSR sent by the UE as an earlier BSR may just be being received late, for example due to HARQ retransmissions. This can lead to the problem that a BSR with zero may be received by the UE and then the network removes UL resource from the UE, even though the UE now has data to be sent in its buffer. The UE cannot send SR as the trigger for a regular BSR (new data with higher priority) is not met even if a periodic BSR is configured An example of this is shown on FIG. 2. On this time chart, it can be seen that the buffer status report 1000, which is sent before the buffer status report 1001, is received only after, because of the number of retransmissions. This report may be a periodic report, which can indicate that no data is in the buffer status report. If the primary station receives the reports in the indicated order, it will wrongly believe that the current status is that no data is in the buffer of the secondary station. Because of that, it will remove the UL resource from UE, that should have been granted.

The main problem here is that an SR cannot be generated from a periodic BSR, because if an SR were generated from a periodic BSR then the UE would be constantly asking for UL resources when there may be none available.

In the case described above the UE UL data buffer is out of synchronisation with the network view of the buffer. The present invention provides a method for distinguishing the order in which the BSRs from the UE should be acted on, by means of information transmitted together with the BSR.

In the case where the BSR is included with data then there is already a sequence number present in the MAC packet arising from the RLC sequence number of the data segments in the MAC packet, and hence the said information comprises the RLC sequence number. This sequence number could be used to identify the timing of the included BSR, so that it is not acted on out of sequence.

If there is no data sent along with the BSR (as would occur for example when a zero BSR report is sent), then one possibility would be to generate an RLC packet with only the sequence number to accompany the BSR. One means for generating such a packet could be to generate a zero-payload RLC PDU, consisting of just (all or part of) the RLC header including the RLC sequence number. Alternatively an additional small-payload RLC PDU could be generated, containing data which would not otherwise have been transmitted, such as an extra report of a measurement of a system parameter which may be useful for the network.

Alternatively, the said information could comprise a sequence number generated by the MAC layer itself (i.e. the same protocol layer as processes the BSR, thus reducing cross-layer processing), for example derived from the last RLC sequence number sent. In some embodiments such a MAC-level sequence number could be generated regardless of whether there was other data to be sent along with the BSR, or alternatively only in cases when there was no data to be sent along with the BSR.

Some other possibilities would include the information being comprised of dedicated BSR sequence numbers or timestamps (absolute or relative) rather than sequence numbers. In cases where the information does not comprise the RLC sequence number, an association between the information and an RLC sequence number of a system frame number or a subframe number could be defined or signalled.

In a second embodiment, this invention could also be applied to other reports that a UE might generate, for example channel state information such as CQI (Channel Quality Information), PMI (Precoding Matrix Indication) or RI (Rank Indication). In general, these can be sent together with data, or separately. In the current LTE specification, channel state information is sent using physical layer signalling, but in principle it could be sent as MAC control elements. An applicable embodiment would be in a system like LTE-Advanced employing a relay between UE and eNodeB. Channel state information sent on the physical layer from the UE to the relay could be sent from the relay to the eNodeB using MAC control elements, along with BSR. This information would be used for scheduling by the eNodeB.

This invention may be implemented in mobile communication systems where communication devices utilize centralized scheduling, such as UMTS and LTE.

Moreover, this invention could as well be implemented for hubs which route connections from multiple terminals to base stations. Such devices would appear like a secondary station from the point of view of the network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method of communicating in a network, the network comprising a primary station and a secondary station wherein the primary station allocates transmission resources to the secondary station over the network, the method comprising:
   a secondary station transmitting to a primary station a report packet comprising a report representative of one or more parameters of a channel or a current amount of data in a buffer of the secondary station, wherein the data in the buffer corresponds to at least one group of logical channels to be transmitted to the primary station,
   the secondary station monitoring before transmission of the report packet to the primary station over the network, whether said report packet includes a first indication of the order of the first transmission of a sequence of packets transmitted to the primary station, and
   the secondary station adding to the report packet before transmission of the report packet to the primary station, a second indication of the order of the first transmission of the sequence of packets transmitted to the primary station, the second indication being dependent on whether a first indication was detected in the monitoring step or not.

2. The method of claim 1, wherein the second indication of the order of transmission is a sequence number indicating the sequential order of the first transmission of each packet of the sequence of packets to the primary station.

3. The method of claim 1, wherein the second indication of the order of the first transmission is an indication of the time at which the packet is transmitted for the first time to the primary station.

4. The method of claim 2, wherein the step of adding the second indication of the order of the first transmission comprises generating an extra packet to be included in the report packet, said extra packet consisting of at least a sequence number.

5. The method of claim 4, wherein the extra packet is a zero payload packet, consisting only of a header containing the sequence number.

6. The method of claim 1, wherein the step of adding a second indication of the order of the first transmission is carried out at a same protocol layer as the processing of the report.

7. The method of claim 6 wherein said same protocol layer is a Medium Access Control (MAC) layer.

8. The method of claim 1, wherein the step of adding the second indication of the order of the first transmission is carried out only if a first indication was detected in the monitoring step.

9. The method of claim 1, wherein the step of adding the second indication of the order of the first transmission is carried out only if a first indication was not detected in the monitoring step.

10. The method of claim 1, wherein the first indication of the order of the first transmission of the packets is a sequence number indicating the sequential order of the first transmission of each packet of the sequence of packets, the sequence of packets including none or more report packets and also packets additional to those report packets.

11. The method of claim 1, wherein the report is a Buffer Status Report (BSR) representative of the amount of data in a buffer of the secondary station.

12. The method of claim 1, wherein the report is a Channel Quality Information (CQI) report representative of one or more parameters of a channel.

13. A secondary station comprising:
   a transmitter for transmitting to a primary station a report packet representative of one or more parameters of the channel or the amount of data in a buffer of the secondary station,
   a controller for monitoring before transmission of the report packet whether said report packet includes a first indication of the order of transmission of a sequence of transmitted packets, and said controller being arranged for adding before transmission of the report packet a second indication of the order of transmission of the sequence of transmitted packets, the second indication being dependent on whether a first indication was detected in the monitoring step or not.

14. A system of communication comprising:
   a primary station communicating with a secondary station, said secondary station comprising:
   a transmitter for transmitting to the primary station a report packet representative of the amount of data in a buffer of the secondary station, and
   a controller for monitoring before transmission of the report packet whether said report packet includes a first indication of the order of transmission of a sequence of transmitted packets, and said controller being arranged for adding before transmission of the report packet a second indication of the order of transmission of the sequence of transmitted packets, the second indication dependent on whether a first indication was detected in the monitoring step or not.

15. A method of communicating in a network, comprising the steps of, at a secondary station:
    transmitting to a primary station a report packet comprising a Buffer Status Report (BSR) representative of the amount of data in a buffer of the secondary station,
    monitoring before transmission of the report packet whether said report packet includes a first indication of the order of first transmission of a sequence of transmitted packets, said first indication of the order of first transmission being relative to other data sent along with the Buffer Status Report, and
    at least if a first indication of the order of first transmission was not detected in the monitoring step, adding before transmission of the report packet a second indication of the order of first transmission of the sequence of transmitted packets.

16. A secondary station comprising
    a transmitter for transmitting to a primary station a report packet comprising a Buffer Status Report (BSR) representative of the amount of data in a buffer of the secondary station,
    a controller for monitoring before transmission of the report packet whether said report packet includes a first indication of the order of a first transmission of a sequence of transmitted packets, said first indication of the order of first transmission being relative to user data sent along with the Buffer Status Report, and said controller being arranged for, at least upon detecting that the first indication of the order of the first transmission is missing, and before transmission of the report packet, adding a second indication of the order of the first transmission of a sequence of transmitted packets.

17. A system of communication comprising:
    a primary station communicating with a secondary station, said secondary station comprising:
    a transmitter for transmitting to the primary station a report packet comprising a Buffer Status Report (BSR) representative of the amount of data in a buffer of the secondary station,
    a controller for monitoring before transmission of the report packet whether said report packet includes a first indication of the order of first transmission of a sequence of transmitted packets, said first indication of the order of first transmission being relative to other data sent along with the Buffer Status Report, and said controller being arranged for, at least upon detection that the first indication of the order of first transmission is missing and before transmission of the report packet, adding a second indication of the order of first transmission of the sequence of transmitted packets.

18. A method of a primary station communicating in a network, the network comprising a primary station and at least one secondary station wherein the primary station allocates transmission resources to the secondary station over the network, the method comprising:
    receiving at a receiver of the primary station a sequence of packets through at least one asynchronous channel from a secondary station and further receiving a report packet comprising a report representative of one or more parameters of a channel or a current amount of data in a buffer of the secondary station, wherein the data corresponds to at least one group of logical channels to be transmitted to the primary station, and at times the report packet comprising a first indication of the order of first transmission of the sequence of packets received by the asynchronous channel from the secondary station, and at times the report packet comprising a second indication of the order of first transmission of the sequence of packets received by the asynchronous channel from the secondary station, the second indication being different than the first indication, the second indication being present depending on the presence or absence of the first indication;
    processing by a processor of the primary station the sequence of packets received from the secondary station depending on the order of transmission indicated by any first or second indications in the report packet, the processing including allocating transmission resources to the secondary station depending on the report and on any first or second indications; and
    transmitting from a transmitter of the primary station to the secondary station, information on the allocation of resources allocated to the secondary station by the primary station responsive to receiving said report packet.

19. A primary station comprising:
    a receiver receiving a sequence of packets through at least one asynchronous channel from a secondary station and for receiving a report packet comprising a report representative of one or more parameters of a channel or a current amount of data in a buffer of the secondary station, wherein the data corresponds to at least one group of logical channels to be transmitted to the primary station, and at times the report packet comprising a first indication of the order of a first transmission of the sequence of packets received by the asynchronous channel from the secondary station, and at times the report packet comprising a second indication of the order of the first transmission of the sequence of packets received by the asynchronous channel from the secondary station, the second indication being different than the first indication, the second indication being present depending on the presence or absence of the first indication;
    a processor processing the sequence of packets received from the secondary station depending on the report contained in the report packet and depending on the order of transmission indicated by any first or second indications in the report packet, the processing including allocating transmission resources to the secondary station depending on the report and on any first or second indications; and
    a transmitter transmitting to the secondary station, information on the allocation of transmission resources allocated to the secondary station by the primary station responsive to receiving said report packet.

20. A secondary station comprising:
    a transmitter for transmitting to a primary station a report packet representative of one or more parameters of the channel or the amount of data in a buffer of the secondary station,
    a controller for monitoring before transmission of the report packet whether said report packet includes a first indication of the order of transmission of a sequence of transmitted packets, and said controller being arranged for adding before transmission of the report packet a second indication of the order of transmission of the sequence of transmitted packets, the second indication being always present or being dependent on whether a first indication was detected in the monitoring step or not.

21. A system of communication comprising:
a primary station communicating with a secondary station, said secondary station comprising:
a transmitter for transmitting to the primary station a report packet representative of the amount of data in a buffer of the secondary station, and
a controller for monitoring before transmission of the report packet whether said report packet includes a first indication of the order of transmission of a sequence of transmitted packets, and said controller being arranged for adding before transmission of the report packet a second indication of the order of transmission of the sequence of transmitted packets, the second indication being always present or being dependent on whether a first indication was detected in the monitoring step or not.

22. A primary station comprising:
a receiver receiving a sequence of packets through at least one asynchronous channel from a secondary station and for receiving a report packet comprising a report representative of one or more parameters of a channel or a current amount of data in a buffer of the secondary station, wherein the data corresponds to at least one group of logical channels to be transmitted to the primary station, and at times the report packet comprising a first indication of the order of a first transmission of the sequence of packets received by the asynchronous channel from the secondary station, and at times the report packet comprising a second indication of the order of the first transmission of the sequence of packets received by the asynchronous channel from the secondary station, the second indication being different than the first indication, the second indication being one of: always present in a report packet; and present depending on the presence or absence of the first indication;
a processor processing the sequence of packets received from the secondary station depending on the report contained in the report packet and depending on the order of transmission indicated by any first or second indications in the report packet, the processing including allocating transmission resources to the secondary station depending on the report and on any first or second indications; and
a transmitter transmitting to the secondary station, information on the allocation of transmission resources allocated to the secondary station by the primary station responsive to receiving said report packet.

* * * * *